United States Patent
Caddell, Jr. et al.

(10) Patent No.: US 6,785,961 B1
(45) Date of Patent: Sep. 7, 2004

(54) TURBINE NOZZLE SEGMENT AND METHOD OF REPAIRING SAME

(75) Inventors: James W. Caddell, Jr., Milford, OH (US); James M. Caldwell, Alexandria, KY (US)

(73) Assignee: General Electric Corporation, Schenectady, NY (US)

( * ) Notice: Subject to any disclaimer, the term of this patent is extended or adjusted under 35 U.S.C. 154(b) by 506 days.

(21) Appl. No.: 09/438,969

(22) Filed: Nov. 12, 1999

(51) Int. Cl.⁷ .............................................. B23P 15/00
(52) U.S. Cl. ................. 29/889.1; 29/402.03; 29/402.08
(58) Field of Search ........................ 29/889.1, 889.21, 29/889.22, 889.72, 402.03, 402.08

(56) References Cited

U.S. PATENT DOCUMENTS

| | | | | |
|---|---|---|---|---|
| 4,096,614 A | * | 6/1978 | Brungard et al. | 29/889.1 |
| 4,141,124 A | * | 2/1979 | Ryan | 29/889.1 |
| 4,176,433 A | | 12/1979 | Lee et al. | 29/156.8 B |
| 4,194,869 A | | 3/1980 | Corcokios | 415/216 |
| 4,400,915 A | * | 8/1983 | Arrigoni | 29/889.1 |
| 4,741,128 A | * | 5/1988 | Reaves et al. | 29/889.1 |
| 5,060,842 A | | 10/1991 | Qureshi et al. | 228/119 |
| 5,197,190 A | * | 3/1993 | Coolidge | 29/889.1 |
| 5,269,057 A | | 12/1993 | Mendham | 29/889.1 |
| 5,272,809 A | * | 12/1993 | Robertson et al. | 29/889.1 |
| 5,560,841 A | | 10/1996 | DeMichael | 219/85.1 |
| 5,697,151 A | * | 12/1997 | Werner et al. | 29/889.1 |
| 5,758,416 A | | 6/1998 | Reverman et al. | 29/889.1 |
| 5,765,993 A | * | 6/1998 | Weiss | 415/209.2 |
| 5,813,832 A | | 9/1998 | Rasch et al. | 415/200 |
| 6,154,959 A | * | 12/2000 | Goodwater et al. | 29/889.1 |
| 6,173,491 B1 | | 1/2001 | Goodwater et al. | 29/889.1 |

* cited by examiner

Primary Examiner—Peter Vo
(74) Attorney, Agent, or Firm—Adams Evans P.A.; James W. Caddell Jr. et al.

(57) ABSTRACT

A method for repairing a turbine nozzle segment having at least two vanes disposed between outer and inner bands includes the steps of separating the nozzle segment into a first singlet containing a repairable vane and a second singlet containing a non-repairable vane, and joining the first singlet to a newly manufactured singlet having a configuration that is similar to the second singlet.

18 Claims, 4 Drawing Sheets

TURBINE NOZZLE SEGMENT AND METHOD OF REPAIRING SAME

BACKGROUND OF THE INVENTION

This invention relates generally to the repair of gas turbine engines and more particularly to the repair of turbine nozzle segments used in such engines.

A gas turbine engine includes a compressor that provides pressurized air to a combustor wherein the air is mixed with fuel and ignited for generating hot combustion gases. These gases flow downstream to one or more turbines that extract energy therefrom to power the compressor and provide useful work such as powering an aircraft in flight. Aircraft engines typically include a stationary turbine nozzle disposed at the outlet of the combustor. The nozzle includes a plurality of circumferentially spaced apart vanes that channel combustion gases into a turbine rotor located downstream of the nozzle. Turbine nozzles are typically segmented around the circumference thereof with each nozzle segment having one or more nozzle vanes disposed between inner and outer bands that define the radial flowpath boundaries for the hot combustion gases flowing through the nozzle.

Nozzle segments are exposed during operation to a high temperature, corrosive gas stream that limits the effective service life of these components. Accordingly, nozzle segments are typically fabricated from high temperature cobalt or nickel-based superalloys and are often coated with corrosion and/or heat resistant materials. Furthermore, nozzle segments are ordinarily cooled internally with cooling air extracted from the compressor to prolong service life. Even with such efforts, portions of the nozzle segments, particularly the vanes, can become cracked, corroded, and otherwise damaged such that the nozzle segments must be either repaired or replaced to maintain safe, efficient engine operation. Because nozzle segments are complex in design, are made of relatively expensive materials, and are expensive to manufacture, it is generally more desirable to repair them if possible.

Existing repair processes include techniques such as crack repair and dimensional restoration of airfoil surfaces. However, such existing repairs are limited by local distortion and under minimum wall thicknesses, which are exceeded as a result of repeated repair and chemical stripping processes. Thus, nozzle segments may become damaged to the point where they cannot be repaired by known repair processes. In turbine nozzle segments having two or more vanes, it often occurs that one of the vanes is repairable while the other vane is non-repairable. To avoid scrapping the entire nozzle segment in such a situation, techniques for salvaging the repairable portion of the nozzle segment have been sought.

One such technique is described in U.S. Pat. No. 4,176,433 issued Dec. 4, 1979 to Jack W. Lee, et al. This patent discloses a method of repairing nozzle segments (referred to therein as turbine vane clusters) in which the repairable vane from a damaged segment is separated from the non-repairable portion of the segment. The salvaged vane is then combined with a complementary repairable vane that has been similarly salvaged from another damaged segment. While this technique salvages repairable vanes that would otherwise be scrapped, the service life of the repaired nozzle segment is not prolonged very long because it contains used vanes that are limited in the number of future repairs that can be made. Furthermore, this technique is viable only as long as suitably complementary salvaged vanes are available to combine.

Accordingly, there is a need for a method of repairing turbine nozzle segments in which repairable vanes are salvaged in such a manner that the service life of the nozzle segment is greatly enhanced.

BRIEF SUMMARY OF THE INVENTION

The above-mentioned need is met by the present invention which provides a method of repairing a turbine nozzle segment having at least two vanes disposed between outer and inner bands. The method includes the steps of separating the nozzle segment into a first singlet containing a repairable vane and a second singlet containing a non-repairable vane, and joining the first singlet to a newly manufactured singlet having a configuration that is similar to the second singlet.

The present invention and its advantages over the prior art will become apparent upon reading the following detailed description and the appended claims with reference to the accompanying drawings.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
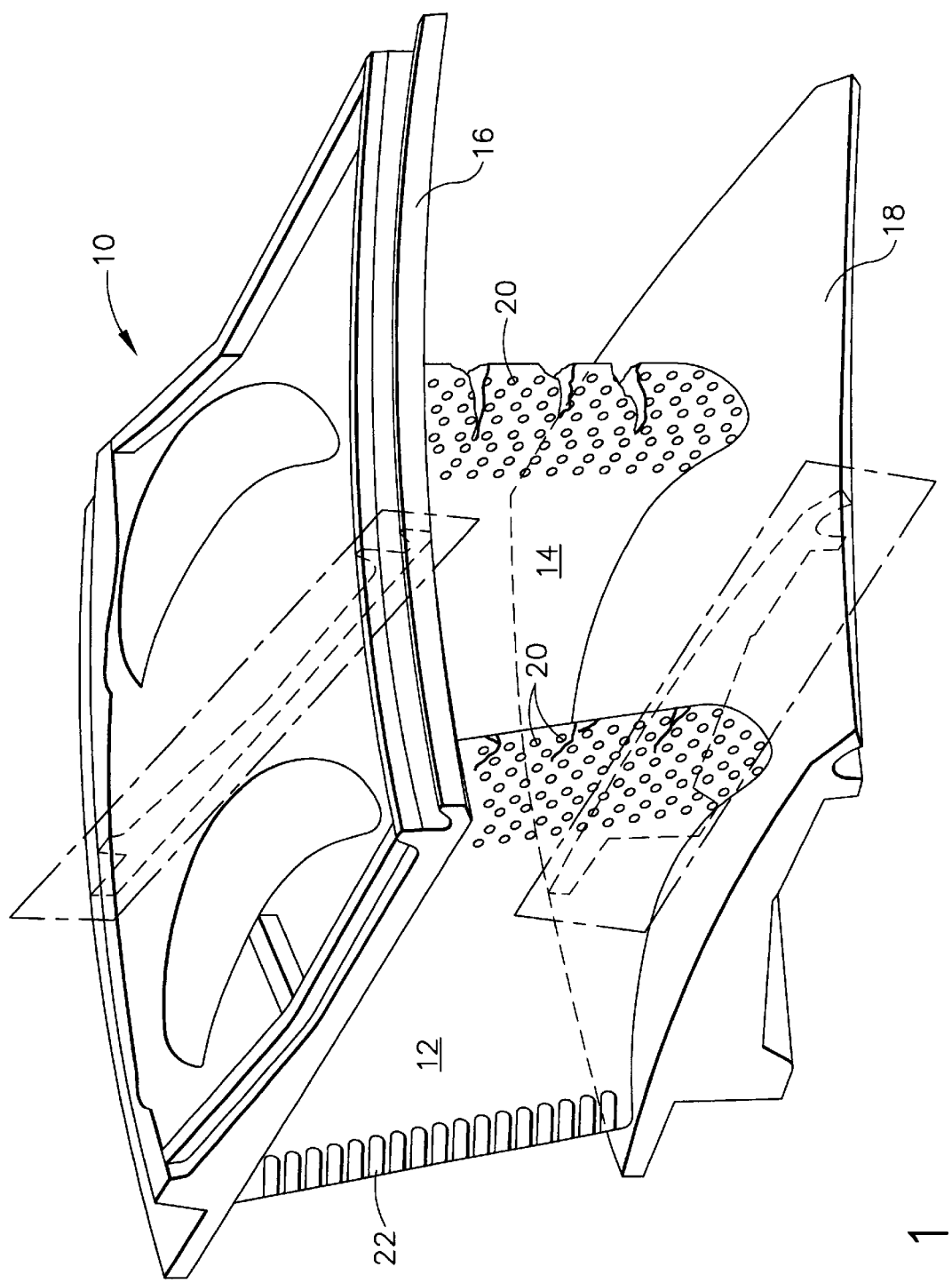
FIG. 1 is a perspective view of a turbine nozzle segment in need of repair.

Referring to the drawings wherein identical reference numerals denote the same elements throughout the various views, FIG. 1 shows a turbine nozzle segment 10 having first and second nozzle vanes 12 and 14. The vanes 12 and 14 are disposed between an arcuate outer band 16 and an arcuate inner band 18. The vanes 12 and 14 define airfoils configured so as to optimally direct the combustion gases to a turbine rotor (not shown) located downstream thereof. The outer and inner bands 16 and 18 define the outer and inner radial boundaries, respectively, of the gas flow through the nozzle segment 10. The vanes 12 and 14 preferably have a plurality of conventional cooling holes 20 and trailing edge slots 22 formed therein. The nozzle segment 10 is preferably made of a high quality superalloy, such as a cobalt or nickel-based superalloy, and may be coated with a corrosion resistant material and/or thermal barrier coating. A gas turbine engine will include a plurality of such segments 10 arranged circumferentially in annular configuration. While the repair methods of the present invention are described herein with respect to a two-vane nozzle segment, it should be recognized that the present invention is equally applicable to nozzle segments having more than two vanes.

During engine operation, the nozzle segment 10 can experience damage such as might result from local gas stream over-temperature or foreign objects impacting thereon. As mentioned above, a portion of the nozzle segment 10 may become damaged to the point where it cannot be repaired by known repair processes. The present invention is directed to a method of repairing a nozzle segment in which one of the vanes 12 and 14 is non-repairable while the other vane is repairable. By way of example, the first vane 12 is shown in FIG. 1 as having relatively minor damage and is thus a repairable vane. The second vane 14 is shown in FIG. 1 as having extensive damage such that it is non-repairable. However, it should be understood that the present invention would be equally applicable to a nozzle segment in which the first vane 12 was non-repairable vane and the second vane 14 was repairable.

Figure 2:
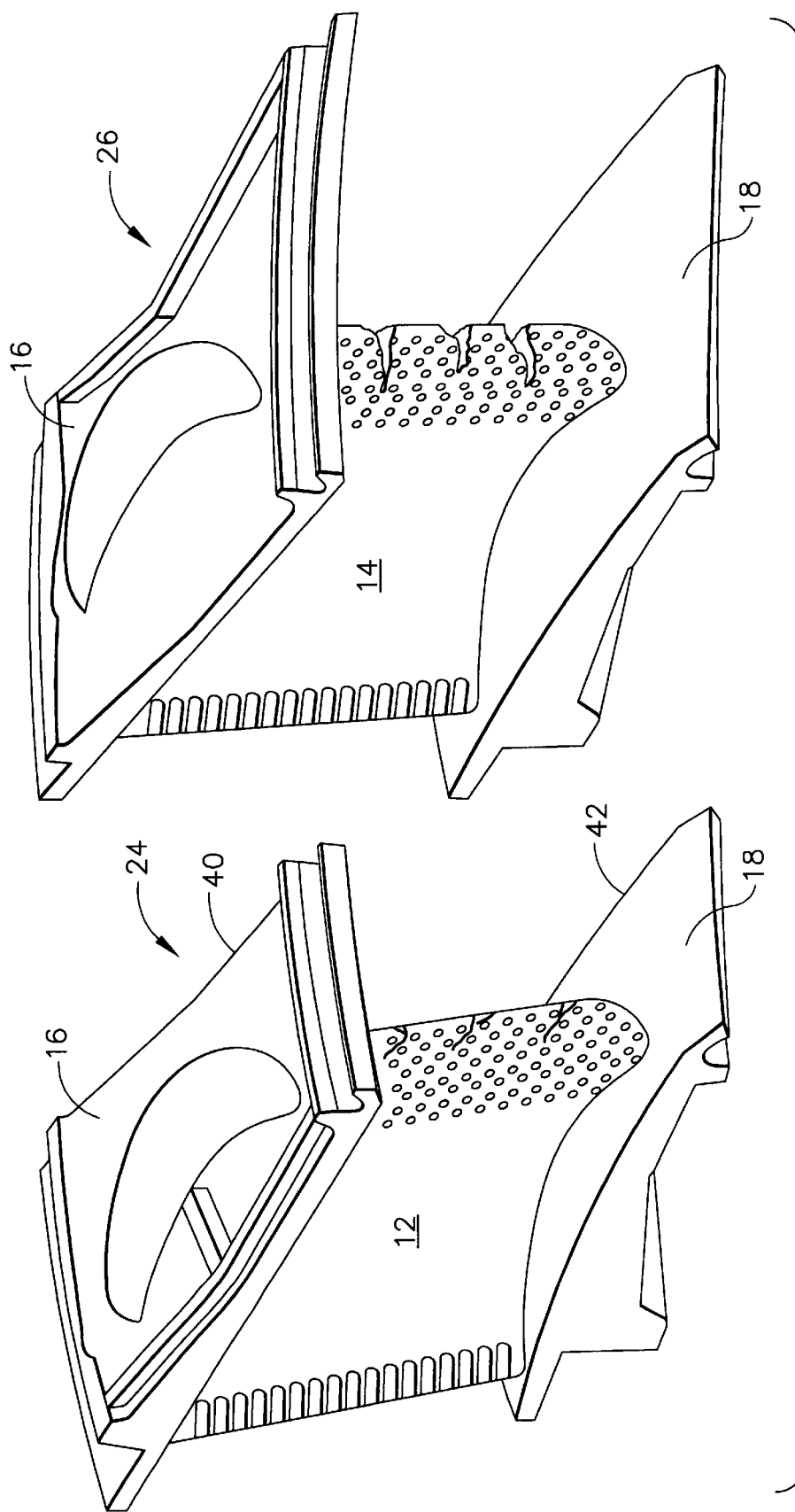
FIG. 2 is a perspective view of the turbine nozzle segment of FIG. 1 after the two vanes have been separated.
Figure 3:
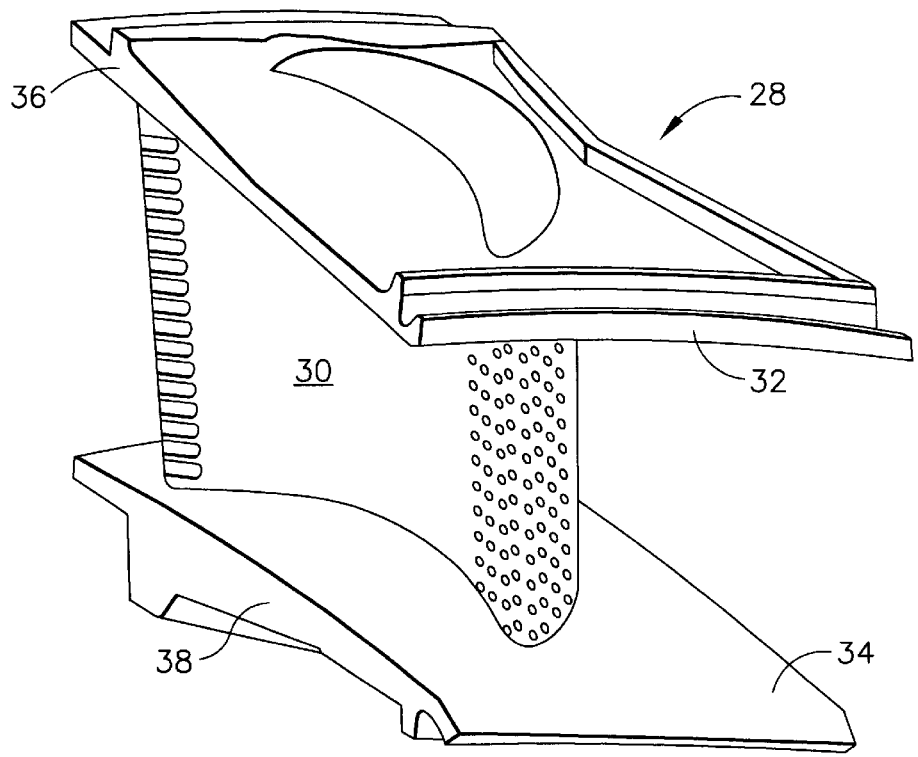
FIG. 3 is a perspective view of a new nozzle singlet used in the repair method of the present invention.

The present invention includes a method of repairing the nozzle segment 10 in which the non-repairable vane 14 and some adjoining structure are replaced with a newly manufactured casting. The method includes the principle steps of separating the repairable vane 12 from the non-repairable vane 14 by cutting along the outer and inner bands 16 and 18. Thus, the segment 10 is separated into first and second sections or "singlets" 24 and 26 (see FIG. 2). As used herein, the term "singlet" refers to the assembly of a single vane disposed between a contiguous portion of the outer band 16 and a contiguous portion of the inner band 18. The first singlet 24 contains the repairable vane 12 and is thus salvageable, and the second singlet 26 contains the non-repairable vane 14 and is thus unsalvageable. The salvageable singlet 24 is subsequently joined to a newly manufactured singlet 28 that has the same configuration as the unsalvageable singlet 26 so as to result in a repaired nozzle segment. As seen in FIG. 3, the new singlet 28 includes a vane 30 disposed between outer and inner band portions 32 and 34. The left edges (as viewed in FIG. 3) of the outer and inner band portions 32 and 34 define joining surfaces 36 and 38, respectively.

More specifically, the repair method of the present invention includes an initial step of inspecting used nozzle segments to identify such segments 10 that have one vane that is repairable and another vane that is not repairable. Once a suitable segment 10 has been identified, it should be stripped of any coating materials (such as corrosion or thermal resistant coatings) that may be present. The coating material may be stripped using any suitable technique, such as grit blasting, chemical baths, and the like, or a combination of such techniques. In addition, residual stresses in the segment 10 may be relieved. Without stress relief, subsequent machining and repair processes may induce deformation and resultant mismatching between the bands 16 and 18 of the salvageable singlet 24 and the corresponding outer and inner band portions 32 and 34 of the new singlet 28. Stress relief may be accomplished in any known manner such as subjecting the nozzle segment 10 to a relatively high temperature and a controlled pressure for a sufficient time.

The next step is to separate the repairable vane 12 from the non-repairable vane 14. The vane separation could be done prior to stripping the coating material and relieving residual stresses. However, it is preferred that the stress relief step be carried out prior to separation. This is because relieving the stress with the segment 10 in one piece holds the bands 16 and 18 at near print dimensions without additional fixturing. Maintaining the band dimensions facilitates the subsequent joining of the new singlet 28 to the salvageable singlet 24.

Separation is accomplished by cutting the outer and inner bands 16 and 18 in two along substantially axial cuts located between the two vanes 12 and 14. The cutting can be performed by any conventional means such as an abrasive cutting wheel or electrical discharge machining. After cutting, the salvageable singlet 24 retains the portions of the outer and inner bands 16 and 18 that are contiguous to the repairable vane 12. As shown in FIG. 2, the cut surfaces of the outer and inner band portions 16 and 18 define joining surfaces 40 and 42, respectively, that will be joined together with corresponding joining surfaces 36 and 38 on the new singlet 28. Preferably, the band cuts (shown in phantom lines in FIG. 1) are made closer to the non-repairable vane 14 than the repairable vane 12 so as to leave excess band material on the salvageable singlet 24. This allows for machining of the band portions 16 and 18.

After separation, the unsalvageable singlet 26, containing the nonrepairable vane 14, is scrapped, and the outer and inner band portions 16 and 18 on the salvageable singlet 24 are machined so that the joining surfaces 40 and 42 will dimensionally match the joining surfaces 36 and 38 of the new singlet 28. Machining of the joining surfaces 40 and 42 also assures that the band portions 16 and 18 are properly sized so that when the salvageable singlet 24 and the new singlet 28 are joined together, the spacing between the first vane 12 and the vane 30 of the new singlet 28 meets gas flow area requirements of the nozzle segment 10.

The next step prior to joining the two singlets 24 and 28 is to carry out an initial repair of the repairable vane 12 using known repairs such as alloy brazing, welding and the like. The purpose of the initial repair step is to fix relatively minor damage such as small cracks in the repairable vane 12.

The new singlet 28 is preferably manufactured by a casting and machining process that is similar to that used for making conventional nozzle segments, except, of course, the new singlet 28 contains the single vane 30. Prior to being joined to the salvageable singlet 24, the new singlet 28 is preliminarily machined to remove excess stock material. Furthermore, the new singlet 28 is preliminarily machined to an in-process shape that is slightly larger than the design shape of the unsalvageable singlet 26. This in-process shape assures a smooth interface between the two singlets after joining and final machining.

Figure 4:
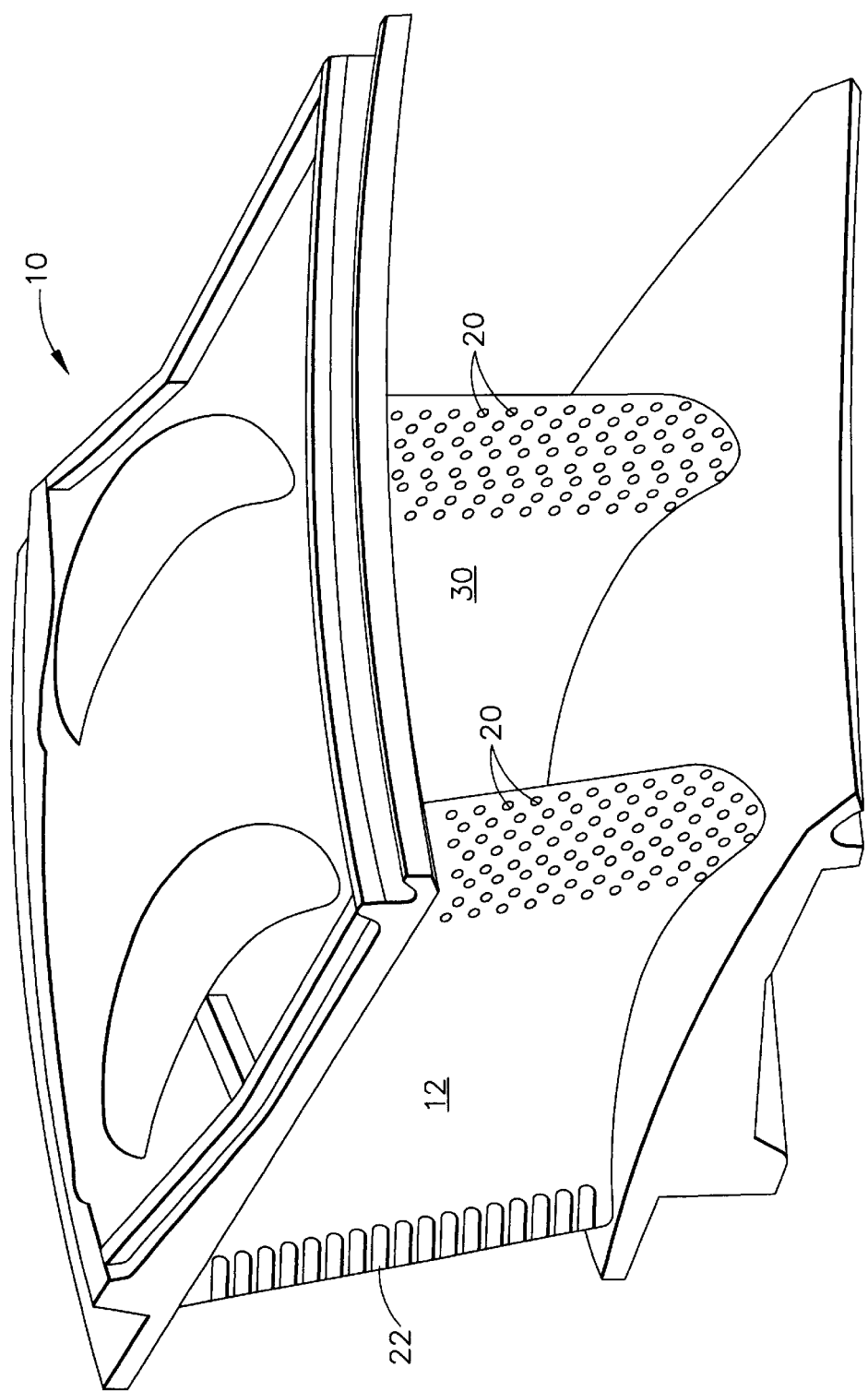
FIG. 4 is a perspective view of the turbine nozzle segment of FIG. 1 after being repaired by the method of the present invention.

Once the singlets 24 and 28 have been prepared, they are joined together, as shown in FIG. 4, to restore the nozzle segment 10. The two singlets 24 and 28 are joined together by bonding the joining surfaces 40 and 42 of the salvageable singlet 24 to the corresponding joining surfaces 36 and 38 of the new singlet 28. Bonding may be accomplished in a conventional manner by any suitable process including brazing, welding or diffusion bonding.

In one preferred embodiment, the new singlet 28 is fabricated from the same material as the salvageable singlet 24 to produce a restored nozzle segment 10 that retains its original material properties. However, in another preferred embodiment, the new singlet 28 is fabricated from a different material, preferably an alloy having enhanced material properties. It is often the case that during the service life of a gas turbine engine component such as a nozzle segment, improved alloys suitable for use with such components are developed. Traditionally, engine operators would have to replace existing components with new components fabricated from the improved alloy to realize the enhanced material properties. However, by fabricating the new singlet 28 from the improved alloy, the repaired nozzle segment 10 will obtain, in part, the enhanced material properties. In addition, in a subsequent repair to the nozzle segment 10 using the method of the present invention, the repairable vane 12 may become non-repairable. In this case, replacing the unsalvageable portion of the segment 10 with another new singlet fabricated from the improved alloy would result in the entire segment 10 having the enhanced material properties without the cost of purchasing an entire replacement part.

After joining the two singlets 24 and 28 together, a restored nozzle segment 10 having a previously used section (corresponding to the salvageable singlet 24) and a newly manufactured section (corresponding to the new singlet 28) exists. The next step is to complete the repair of the repairable vane 12 and adjoining structure. While the initial repair step described above repaired relatively minor damage, more extensive repairable damage, such as large cracks and worn surfaces, will need to be repaired. Such additional repair may be accomplished using a standard alloy build up technique. Generally, this entails covering the nozzle segment 10 with a suitable alloy powder or paste and then heating the segment 10 to diffusion bond the added alloy thereto. Afterwards, the entire segment 10, including the newly manufactured section, is machined to its design shape. Performing the alloy build up process and final machining after the two singlets 24 and 28 have been joined assures that no steps or discontinuities exist at the interface of the two singlets. Lastly, any corrosion or thermal coatings that were originally used are reapplied in a known manner.

Figure 5:
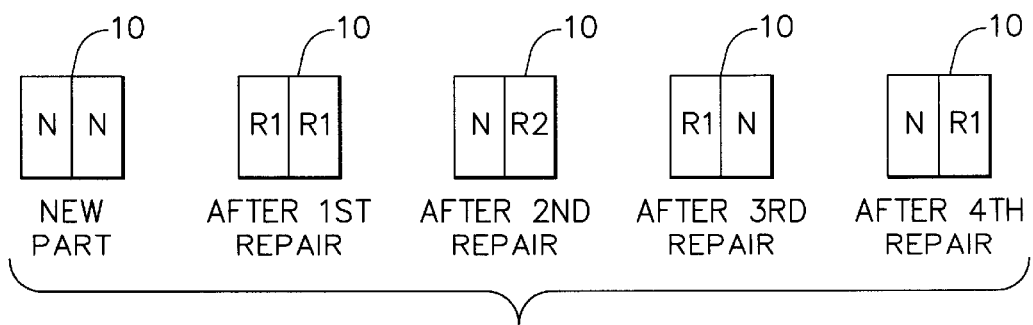
FIG. 5 is a diagram showing one repair schedule of the present invention.

As described above, the repair method of the present invention relies on inspection of used nozzle segments to identify segments that have a repairable vane and a non-repairable vane. With this approach, only segments determined to have repairable and non-repairable vanes would be subject to the repair method of the present invention. Alternatively, the repair method of the present invention could be conducted on a scheduled basis. For example, FIG. 5 shows one schedule for a two-vane nozzle segment in which the vanes are regularly replaced with a newly manufactured singlet using the method described above. While one possible schedule is described, it should be noted that other schedules could be utilized as well.

In FIG. 5, the nozzle segment 10 is represented schematically at various times throughout its service life. In each instance, the left half of the block represents one singlet and the right half of the block represents the other singlet. The leftmost depiction in the Figure represents the segment when it is a new part. Thus, each singlet is new as denoted by the N's. The next depiction is the segment at the time of its first repair. Here, assuming that neither vane has been abnormally damaged, each singlet undergoes conventional repairs. Thus, each singlet has been repaired once, as denoted by the R1's. The next depiction is the segment at the time of its second repair. This time the singlet that is in the worse shape is separated from the other singlet and replaced with a newly manufactured singlet using the steps described above, which includes standard repair to the other singlet. Thus, one singlet is new (denoted by the N), and the other singlet has been repaired twice (denoted by the R2). The next depiction is the segment at the time of its third repair. This time the singlet that was not replaced at the second repair is replaced with a newly manufactured singlet and the other singlet undergoes standard repair. Thus, one singlet is new (denoted by the N) and the other singlet has been repaired once (denoted by the R1). The last depiction is the segment at the time of its fourth repair. Here, the singlet that was not replaced at the third repair is replaced with a newly manufactured singlet and the other singlet undergoes standard repair. Thus, one singlet is new (denoted by the N) and the other singlet has been repaired once (denoted by the R1). From here, the sequence would continue such that new replacement singlet would alternate from side to side.

The foregoing has described a method of repairing a turbine nozzle segment in which the service life of the nozzle segment is greatly enhanced. While specific embodiments of the present invention have been described, it will be apparent to those skilled in the art that various modifications thereto can be made without departing from the spirit and scope of the invention as defined in the appended claims.

What is claimed is:

1. A method of repairing a turbine nozzle segment having at least two vanes disposed between outer and inner bands, said method comprising the steps of:
    separating said nozzle segment into a first singlet containing one of said vanes and a second singlet containing another one of said vanes; and
    joining said first singlet to a newly manufactured singlet having a configuration that is similar to said second singlet.

2. The method of claim 1 wherein said step of separating said nozzle segment into first and second singlets comprises cutting said outer band and said inner band in two between said two vanes.

3. The method of claim 1 further comprising the step of repairing damage in said first singlet.

4. The method of claim 3 wherein some damage in said first singlet is repaired prior to joining said first singlet to said newly manufactured singlet and some damage in said first singlet is repaired subsequently to joining said first singlet to said newly manufactured singlet.

5. The method of claim 1 wherein said newly manufactured singlet has an in-process shape that is larger than said second singlet.

6. The method of claim 1 further comprising the step of applying an alloy build up to said nozzle segment, subsequently to joining said first singlet to said newly manufactured singlet.

7. The method of claim 6 further comprising the step of machining said nozzle segment to its design shape subsequently to applying said alloy build up.

8. The method of claim 1 wherein said newly manufactured singlet is fabricated from the same material as said first singlet.

9. The method of claim 1 wherein said newly manufactured singlet is fabricated from a material that has enhanced material properties with respect to the material that said first singlet is fabricated from.

10. The method of claim 1 further comprising the steps of separating said first singlet from said newly manufactured singlet; and
    joining said newly manufactured singlet to another newly manufactured singlet having a configuration that is similar to said first singlet.

11. A method of repairing a turbine nozzle segment having a repairable vane and a non-repairable vane disposed between a first outer band and a first inner band, said method comprising the steps of:
    providing a newly manufactured singlet including a vane disposed between a second outer band having a first joining surface and a second inner band having a second joining surface;
    cutting said first outer band and said first inner band of said nozzle segment in two between said two vanes so as to separate said nozzle segment into a first singlet containing said repairable vane and a second singlet containing said non-repairable vane, wherein said first singlet includes a third joining surface on said first outer band and a fourth joining surface on said first inner band;

repairing damage in said first singlet; and joining said first singlet to said newly manufactured singlet by bonding said first and third joining surfaces together and said second and fourth joining surfaces together.

12. The method of claim 11 wherein said newly manufactured singlet has an in-process shape that is larger than said second singlet.

13. The method of claim 11 further comprising the step of applying an alloy build up to said nozzle segment, subsequently to joining said first singlet to said newly manufactured singlet.

14. The method of claim 13 further comprising the step of machining said nozzle segment to its design shape subsequently to applying said alloy build up.

15. The method of claim 11 wherein said newly manufactured singlet is fabricated from the same material as said first singlet.

16. The method of claim 11 wherein said newly manufactured singlet is fabricated from a material that has enhanced material properties with respect to the material that said first singlet is fabricated from.

17. The method of claim 11 further comprising the step of machining said third and fourth joining surfaces prior to joining said first singlet to said newly manufactured singlet.

18. The method of claim 11 further comprising the steps of separating said first singlet from said newly manufactured singlet; and joining said newly manufactured singlet to another newly manufactured singlet having a configuration that is similar to said first singlet.

* * * * *